United States Patent
Arold

[19]

[11] Patent Number: 6,116,329
[45] Date of Patent: Sep. 12, 2000

[54] HEATING OR AIR-CONDITIONING SYSTEM

[75] Inventor: Klaus Arold, Sindelfingen, Germany

[73] Assignee: DaimlerChrysler AG, Stuttgart, Germany

[21] Appl. No.: 08/986,744

[22] Filed: Dec. 8, 1997

[30] Foreign Application Priority Data

Dec. 7, 1996 [DE] Germany .............................. 196 50 909

[51] Int. Cl.$^7$ .................................................. F25B 29/00
[52] U.S. Cl. ......................... 165/43; 165/42; 237/12.3 A; 237/12.3 B; 454/126; 454/127; 454/156; 454/160; 454/161
[58] Field of Search ............................... 165/42, 43, 204; 237/12.3 A, 12.3 B; 454/156, 126, 127, 160, 161

[56] References Cited

U.S. PATENT DOCUMENTS

| | | | |
|---|---|---|---|
| 4,940,083 | 7/1990 | Takenaka et al. | 165/43 |
| 5,042,566 | 8/1991 | Hildebrand | 165/43 |
| 5,042,567 | 8/1991 | Kajimoto et al. | 165/42 |
| 5,106,018 | 4/1992 | Loup | 165/43 |
| 5,109,755 | 5/1992 | Guillemin | 237/12.3 A |
| 5,199,485 | 4/1993 | Ito et al. | 165/43 |
| 5,392,845 | 2/1995 | Honda et al. | 165/43 |
| 5,505,251 | 4/1996 | Sarbach | 165/42 |

FOREIGN PATENT DOCUMENTS

| | | | |
|---|---|---|---|
| 0 246948 | 11/1987 | European Pat. Off. | |
| 2621868 | 4/1989 | France | 165/43 |
| 2 637 548 | 4/1990 | France . | |
| 3338768 | 5/1985 | German Dem. Rep. | 165/43 |
| 3733127 | 7/1989 | Germany | 237/12.3 A |
| 39 28 944 | 3/1991 | Germany . | |
| 928944C3 | 3/1991 | Germany . | |
| 195 46915 | 6/1996 | Germany . | |
| 0177707 | 10/1983 | Japan | 165/43 |
| 0224809 | 12/1983 | Japan | 165/43 |
| 0193918 | 8/1986 | Japan | 165/43 |
| 0962037 | 9/1982 | U.S.S.R. | 165/43 |

*Primary Examiner*—John K. Ford
*Attorney, Agent, or Firm*—Evenson, McKeown, Edwards & Lenahan, P.L.L.C.

[57] ABSTRACT

The invention relates to a heating or air-conditioning system for vehicle interiors having an air distributor which is connected to an air guiding duct and has air outlet openings for the lower plane of the vehicle interior. An air guiding duct with air outlet openings for a center plane of the vehicle interior is connected by way of a cold-air inlet with the cold-air duct and by way of a warm-air inlet with the air distributor. One cold-air or warm-air flap respectively is in each case assigned to the cold-air and warm-air inlet. The flaps are configured and disposed for the purpose of a faster cooling of the vehicle interior by the large-area flowing of cold air into all areas of the vehicle interior. On the one hand, the geometry of the cold-air flap swivelling about a swivel axis arranged in the center and, on the other hand, the arrangement of the swivel axis in the air guiding duct is defined such that, in its opening position completely opening up the cold-air inlet, the cold-air flap projects by means of its one longitudinal edge into the cold-air inlet and, by means of its opposite other longitudinal edge, rests against a wall area of the air guiding duct which, viewed in the air flow direction, is situated behind the warm-air inlet and, as a result, divides the cold-air flow flowing into the cold-air inlet into a partial flow to the center nozzle and a partial flow to the air distributor.

25 Claims, 1 Drawing Sheet

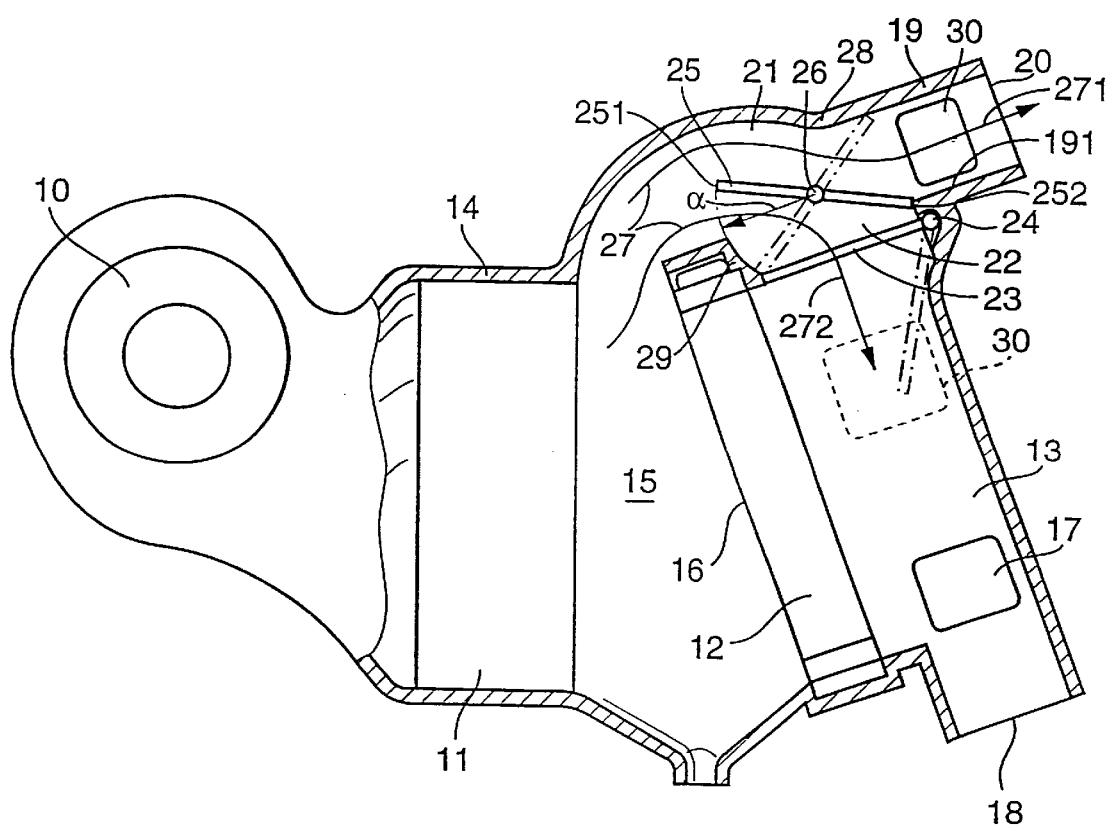

HEATING OR AIR-CONDITIONING SYSTEM

BACKGROUND AND SUMMARY OF THE INVENTION

This application claims the priority of German application 196 50 909.2-16 filed in Germany on Dec. 7, 1996, the disclosure of which is expressly incorporated by reference herein.

The invention relates to a heating or air-conditioning system for vehicle interiors.

In the case of a known air-conditioning system of this type (German Patent Document DE 39 28 944 C3 or U.S. Pat. No. 5,086,830), the air guiding duct, which extends to the so-called center plane of the vehicle interior or the passenger compartment and there leads into a so-called center nozzle, which is arranged in the dashboard, is constructed without an air flap, and a control unit is provided which has stored characteristic curves for the interrelation between the air quantity and the air temperature of the air flowing out of the center nozzle and which applies actuating variables for an adjustment of the air flaps predetermined by the characteristic curves to the actuators of the warm-air and cold-air flap. This permits a tempering and apportioning of the air flowing out of the center nozzle without air flaps in the air guiding duct. The air distributor connected to the warm-air duct has air outlet openings for the leg room and the rear compartment of the vehicle interior and is acted upon only by warm air.

It is an object of the invention to provide a heating or air-conditioning system of the initially mentioned type which permits a large-area inflow of cold air for the fast cooling of the vehicle interior at low constructive expenditures.

This object is achieved according to the invention by an air distributor which is connected to a warm-air duct and has outlet openings for air outlet at least into a lower plane of the vehicle interior, an air guiding duct with outlet openings for the air outlet into a center plane of the vehicle interior which is connected by way of a cold-air inlet with a cold-air duct and by way of a warm-air inlet with the air distributor, a cold-air flap which is assigned to the cold-air inlet and which can be swivelled about a swivel axis arranged approximately in the center from a closed position completely closing-off the cold-air inlet into an opened position completely exposing the cold-air inlet and vice versa, and a warm-air flap which is assigned to the warm-air inlet and which completely closes off the warm-air inlet in one of two swivel end positions and opens it up completely in the other swivel end position, wherein the cold-air flap is configured and arranged with its swivel axis in the air guiding duct such that the cold-air flap, in its open position, projects by means of one longitudinal edge, preferably in the center, into the cold-air inlet and, by means of an opposite other longitudinal edge, rests on a wall area of the air guiding duct which, viewed in the air flow direction, is situated behind the warm-air inlet, and, as a result, a partial flow to the warm-air inlet branches off the cold- air flow entering in the cold air inlet.

The heating or air-conditioning system according to the invention has the advantage that the cold air flowing from the cold-air duct into the air guiding duct is distributed to the air guiding duct and to the air distributor so that cold air flows not only by way of the center nozzle into the center plane but also by way of the air distributor into the lower area (leg room, rear compartment) of the vehicle interior and provides a cooling of the vehicle interior which, on the whole, is faster.

Advantageous embodiments of the heating or air-conditioning system according to the invention with expedient developments and further developments of the invention are indicated herein.

According to a preferred embodiment of the invention, the cold-air inlet is permanently covered against the entering of cold air over a small swivel range of the cold-air flap starting from the closed position of the cold-air flap. This covered swivel range corresponds to the predetermined control range of the cold-air flap in which, by means of the cold-air flap, cold air is admixed in apportioned quantities to the warm air flowing by way of the warm-air inlet into the air guiding duct. This has the advantage that, in the control range for the temperature reduction of the warm air which flows into the air guiding duct when the warm-air inlet is open, by the admixing of cold air, a return flow of cold air into the air distributor and thus into the leg room and the rear compartment of the motor vehicle compartment is avoided.

Other objects, advantages and novel features of the present invention will become apparent from the following detailed description of the invention when considered in conjunction with the accompanying drawings.

BRIEF DESCRIPTION OF THE DRAWINGS

The single drawing FIGURE is a schematic sectional view of a vehicle interior heating or air-conditioning system constructed according to a preferred embodiment of the invention.

DETAILED DESCRIPTION OF THE DRAWINGS

The air-conditioning system for a motor vehicle, which is illustrated as a schematic lateral, particularly longitudinally sectional view, has a preferably two-flow-channel blower 10, an evaporator 11, a heat exchanger 12 and an air distributor 13. Viewed in the flow direction, the mentioned constructional units are arranged in the mentioned sequence behind one another in a so-called air-conditioning box 14. The blower inlet, which is not visible, is optionally connected with a fresh-air or ambient-air opening by way of which the blower 10 takes in either fresh air from the vehicle environment or ambient air from a vehicle interior. The box section directly adjoining the blower 10 forms a cold-air duct 15 in which the evaporator 11 of the air-conditioning system which covers the whole duct cross-section is accommodated. The cold-air duct 15 is adjoined by a warm-air duct 16 which forms a first air duct through which warm air can pass which is covered on the inlet side by the heat exchanger 12 and, on the outlet side, leads into the air distributor 13. The air distributor 13 has at least one air outlet 17 and one air outlet 18 which are provided for the air supply to the lower area of the vehicle interior. The air outlet 17 leads out by means of a rear compartment nozzle, and the air outlet 18 leads out in a leg room nozzle which are both not shown.

An air guiding duct 19 branches off from the cold-air duct 15, which forms a second air duct through which cold air can pass, in the upper area, specifically in the area between the evaporator 11 and the heat exchanger 12, which air guiding duct 19 extends above the heat exchanger 12 and carries an outlet opening 20 on the end side which, by way of a connection piece, which is not shown, is connected with a so-called center nozzle in the dashboard of the vehicle interior for the air outlet into a center plane of the vehicle interior. By means of a cold-air first inlet 21, the air guiding duct 19 is connected to the cold-air duct 15 and is connected by way of a warm-air second inlet 22 with the air distributor 13. A warm-air flap 23 is assigned to the warm-air inlet 22 and, on one end, is swivellably about a swivel axis 24 held on the air-conditioning box 14 and can be swivelled from a closed position drawn by a solid line in the drawing, in which it completely covers the warm-air inlet 22, into an opening position which is shown in the drawing by a broken line in which it completely opens up the warm-air inlet 22. The warm-air flap 23 can take up any swivel position between these two swivel end positions and can therefore introduce warm air into the air guiding duct 19 in an apportioned manner.

A cold-air flap 25 is assigned to the cold-air inlet 21 and is held swivellably about a swivel axis 26 arranged approximately in its center in the air-conditioning box 14. The cold-air flap 25 can be changed from a closed position, which is shown in the drawing by a broken line, in which it completely covers the cold-air inlet 21, into an opening position, which is shown by a solid line in the drawing, and vice versa, in which it opens up the full cross-section of the cold-air inlet 21. The cold-air flap 25 can also take up any swivel position situated between these two swivel end positions. In this case, the geometry of the cold-air flap 25 and its arrangement in the air guiding duct 19 is defined such that the cold-air flap 25 projects in its opened position shown in the drawing by a solid line by means of its one longitudinal edge 251 approximately in the center into the cold-air inlet 21 and by means of its opposite other longitudinal edge 252 rests on a wall area 191 of the air guiding duct 19 which, viewed in the air flow direction, is situated behind the warm-air inlet 22. In its opening position, the cold-air flap 25 therefore divides the cold air flow which flows in by way of the opened cold-air inlet 21 into the air guiding duct 19 and which is indicated by the arrows 27, into a partial flow 271 extending in the air guiding duct 19 and into a partial flow 272 penetrating into the air distributor 13 when the warm-air flap 23 is open. This adjustment of the cold-air flap 25 is selected in the "maximal cooling" operating mode in which, while the heat exchanger 12 is switched off, the warm-air flap 23 is simultaneously completely opened. Cold air can now flow into the center plane of the vehicle interior by way of the air guiding duct 19 as well as by way of the air distributor 13 into the lower plane of the vehicle interior, whereby, on the whole, the cooling of the vehicle interior is accelerated. In contrast, if the cold-air flap 13 is changed into its closed position (illustrated by a dash-dotted line in the drawing), by means of a more or less wide opening of the warm-air flap 23, apportioned quantities of warm air can be introduced from the air distributor 13 into the air guiding duct so that the center plane of the vehicle interior is acted upon with tempered warm air. The temperature of this warm air can be lowered by the admixing of cold air which can be carried out by a more or less wide opening of the cold-air flap 25.

In order to maintain the simple geometry of the cold-air flap 25 in the case of the described operation of the cold-air flap 25, in the installed position of the air-conditioning box 14 in the vehicle, the warm-air inlet 22 is aligned horizontally or sloped at an acute angle with respect to the horizontal line, and the cold-air inlet 21 is aligned vertically or sloped at an acute angle with respect to the vertical line; the swivelling axis 26 of the cold-air flap 25 is arranged above the warm-air inlet 22 and approximately in the center with respect to it; and the air guiding duct 19 is slightly constricted in its cross-section approximately at the level of the swivel axis 26 of the cold-air flap 25. The point of constriction has the reference number 28.

Over a small swivel range of the cold-air flap 25 which starts from the closed position of the cold-air flap 25 (shown by a broken line in the drawing), the cold-air inlet 21 is permanently covered against the entering of cold air by means of a curved wall web 29 which extends transversely in the air guiding duct 19. The vertical height of the wall web 29 corresponds approximately to the control range of the cold-air flap 25 in which, while the warm-air inlet 22 is open, cold air for the temperature control of the air flowing out of the center nozzle is admixed to the warm air flowing into the air guiding duct 19. In the drawing, this swivel angle range of the cold air flap 25 has the symbol $\alpha$. The wall web 29 prevents that, in this control range of the cold-air flap 25, cold air can flow back into the air distributor 13.

In the air guiding duct 19, downstream of the cold-air flap and the warm-air flap 25, 23, at least one outlet opening 30 is provided which, by way of an air guiding connection piece, is connected to a side nozzle in the dashboard of the vehicle interior which is not shown. As a result, the center nozzle and the side nozzles in the dashboard and thus the whole center plane of the vehicle interior are supplied with equally tempered air. As an alternative, the at least one outlet opening 30 for the side nozzle can also be provided in the air distributor 13, as indicated in the drawing by a broken line. In this case, the air flowing out of the side nozzles and out of the center nozzle can be tempered differently in the center plane.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Heating or air-conditioning system for a vehicle interior comprising:

an air distributor which is connected to an outlet side of a first air duct through which warm air can pass and which has outlet openings for air outlet directly from said first air duct, at least into a lower plane of the vehicle interior, a heat exchanger which covers an inlet side of said first air duct through which warm air can pass, an air guiding duct with outlet openings for the air outlet into a center plane of the vehicle interior which is connected, by way of a first air inlet through which cold air can pass, with a second air duct through which cold air can pass and, by way of a second air inlet through which warm air can pass, with the air distributor, a first air flap which is assigned to the first air inlet and which can be swivelled about a swivel axis arranged approximately at a center of the first air flap from a closed position completely closing-off the first air inlet into an opened position completely exposing the first air inlet and vice versa, and a second air flap which is assigned to the second air inlet and which completely closes off the second air inlet in one of two swivel end positions and opens it up completely in the other swivel end position, wherein the first air flap is configured and arranged with its swivel axis in the air guiding duct such that the first air flap, in its opened position, has one longitudinal edge which projects into and divides the first air inlet and an opposite other longitudinal edge which rests on a wall area of the air guiding duct which, viewed in the air flow direction, is situated behind the second air inlet, and, as a result, a partial flow to the second air inlet branches off a cold air flow entering in the first air inlet.

2. System according to claim 1, wherein the second air inlet is sloped at an acute angle with respect to a horizontal line in the installed position, and the first air inlet is disposed above the second air inlet, and wherein the first air flap is arranged at a distance above the second air inlet with its swivel axis situated approximately centrally with respect to the second air inlet.

3. System according to claim 2, wherein the air guiding duct has a constricted cross-section behind the first air inlet approximately at the level of the swivel axis of the first air flap.

4. System according to claim 1, wherein the first air inlet includes a wall web which is configured to cover the second air inlet against entry of cold air within a swivel range of the first air flap which starts from the closed position of the first air flap.

5. System according to claim 2, wherein the first air inlet includes a wall web which is configured to cover the second air inlet against entry of cold air within a swivel range of the first air flap which starts from the closed position of the first air flap.

6. System according to claim 3, wherein the first air inlet includes a wall web which is configured to cover the second air inlet against entry of cold air within a swivel range of the first air flap which starts from the closed position of the first air flap.

7. System according to claim 4, wherein the swivel range over which the second air inlet is covered corresponds to a predetermined control range for admixing cold air to the warm air flowing into the air guiding duct by way of the second air inlet.

8. System according to claim 5, wherein the swivel range over which the second air inlet is covered corresponds to a predetermined control range for admixing cold air to the warm air flowing into the air guiding duct by way of the second air inlet.

9. System according to claim 6, wherein the swivel range over which the second air inlet is covered corresponds to a predetermined control range for admixing cold air to the warm air flowing into the air guiding duct by way of the second air inlet.

10. System according to claim 1, wherein outlet openings for the flowing of air out of side nozzles arranged in a dashboard in a motor vehicle interior are provided in the air guiding duct.

11. System according to claim 2, wherein outlet openings for the flowing of air out of side nozzles arranged in a dashboard in a motor vehicle interior are provided in the air guiding duct.

12. System according to claim 6, wherein outlet openings for the flowing of air out of side nozzles arranged in a dashboard in a motor vehicle interior are provided in the air guiding duct.

13. System according to claim 7, wherein outlet openings for the flowing of air out of side nozzles arranged in a dashboard in a motor vehicle interior are provided in the air guiding duct.

14. System according to claim 9, wherein outlet openings for the flowing of air out of side nozzles arranged in a dashboard in a motor vehicle interior are provided in the air guiding duct.

15. System according to claim 1, wherein the air guiding duct and the air distributor are constructed in an air-conditioning box in which a blower, an evaporator and said heat exchanger are arranged behind one another in the mentioned sequence viewed in the air flow direction, wherein, in the installed position of the air-conditioning box, the air guiding duct branches off in an upper area of a section of the second air duct enclosed between the evaporator and the heat exchanger, and wherein the first air duct is formed by a box section enclosing the heat exchanger.

16. System according to claim 2, wherein the air guiding duct and the air distributor are constructed in an air-conditioning box in which a blower, evaporator and said heat exchanger are arranged behind one another in the mentioned sequence viewed in the air flow direction, wherein, in the installed position of the air-conditioning box, the air guiding duct branches off in an upper area of a section of the second air duct enclosed between the evaporator and the heat exchanger, and wherein the first air duct is formed by a box section enclosing the heat exchanger.

17. System according to claim 6, wherein the air guiding duct and the air distributor are constructed in an air-conditioning box in which a blower, an evaporator and said heat exchanger are arranged behind one another in the mentioned sequence viewed in the air flow direction, wherein, in the installed position of the air-conditioning box, the air guiding duct branches off in an upper area of a section of the second air duct enclosed between the evaporator and the heat exchanger, and wherein the first air duct is formed by a box section enclosing the heat exchanger.

18. System according to claim 7, wherein the air guiding duct and the air distributor are constructed in an air-conditioning box in which a blower, an evaporator and said heat exchanger are arranged behind one another in the mentioned sequence viewed in the air flow direction, wherein, in the installed position of the air-conditioning box, air guiding duct branches off in an upper area of a section of the second air duct enclosed between the evaporator and the heat exchanger, and wherein the first air duct is formed by a box section enclosing the heat exchanger.

19. System according to claim 10, wherein the air guiding duct and the air distributor are constructed in an air-conditioning box in which a blower, an evaporator and said heat exchanger are arranged behind one another in the mentioned sequence viewed in the air flow direction, wherein, in the installed position of the air-conditioning box, the air guiding duct branches off in an upper area of a section of the second air duct enclosed between the evaporator and the heat exchanger, and wherein the first air duct is formed by a box section enclosing the heat exchanger.

20. System according to claim 14, wherein the air guiding duct and the air distributor are constructed in an air-conditioning box in which a blower, evaporator and said heat exchanger are arranged behind one another in the mentioned sequence viewed in the air flow direction, wherein, in the installed position of the air-conditioning box, the air guiding duct branches off in an upper area of a section of the second air duct enclosed between the evaporator and the heat exchanger, and wherein the first air duct is formed by a box section enclosing the heat exchanger.

21. System according to claim 1, wherein outlet openings for the flowing of air out of side nozzles arranged in a dashboard in a motor vehicle interior are provided in the air distributor.

22. System according to claim 11, wherein outlet openings for the flowing of air out of side nozzles arranged in a dashboard in a motor vehicle interior are provided in the air distributor.

23. System according to claim 12, wherein outlet openings for the flowing of air out of side nozzles arranged in a dashboard in a motor vehicle interior are provided in the air distributor.

24. System according to claim 13, wherein outlet openings for the flowing of air out of side nozzles arranged in a dashboard in a motor vehicle interior are provided in the air distributor.

25. System according to claim 14, wherein outlet openings for the flowing of air out of side nozzles arranged in a dashboard in a motor vehicle interior are provided in the air distributor.

\* \* \* \* \*